United States Patent
Neef et al.

[11] Patent Number: 5,927,472
[45] Date of Patent: Jul. 27, 1999

[54] CONVEYOR TRANSFER UNIT

[75] Inventors: Paul Neef, Hoffman Estates; Charles H. Birks, McHenry, both of Ill.

[73] Assignee: Eisenmann Corporation, Crystal Lake, Ill.

[21] Appl. No.: 08/950,649

[22] Filed: Oct. 15, 1997

[51] Int. Cl.$^6$ .................................................. B65G 29/00
[52] U.S. Cl. ..................... 198/465.4; 198/486.1
[58] Field of Search .................. 198/465.4, 486.1, 198/680, 687.1, 370.1, 370.01, 487.1

[56] References Cited

U.S. PATENT DOCUMENTS

| | | | |
|---|---|---|---|
| 2,628,702 | 2/1953 | Mabrey | 198/27 X |
| 3,917,112 | 11/1975 | Willis et al. | 221/1 X |
| 4,084,684 | 4/1978 | Skinner, II | 189/467 X |
| 4,991,719 | 2/1991 | Butcher et al. | 209/3.3 X |
| 5,125,513 | 6/1992 | Branch | 209/3.3 X |

Primary Examiner—William E. Terrell
Assistant Examiner—K W Bower
Attorney, Agent, or Firm—Lee, Mann, Smith, McWilliams, Sweeney & Ohlson

[57] ABSTRACT

A transfer unit for transferring a ware supporting hanger from one conveyor to another conveyor. The unit is positioned between the conveyors and includes a centrally positioned rotatable support. There is provided a linear rail or arm assembly suspended from the support. A shuttle is mounted to the linear rail or arm so as to move between one end of the rail or arm assembly and the other end of the rail or arm assembly and thus between conveyors. The shuttle is generally linearly shaped and has a hook engaging member at either end. The shuttle is constructed and arranged so that when the shuttle is positioned at the end of the rail or arm assembly one end of the shuttle is positioned in line with the vertical axis of the rotatable support and the other end is positioned to cooperate with a conveyor. The method of operating the transfer unit in combination with the conveyors is also disclosed.

13 Claims, 6 Drawing Sheets

CONVEYOR TRANSFER UNIT

BACKGROUND OF THE INVENTION

This invention relates to overhead conveyors where a hanger with an item of ware or work piece is suspended from one conveyor and transferred to another conveyor, and more specifically, to a linear transfer unit for moving a selected hanger and work piece from one conveyor to another.

Usually a conveyor moves a plurality of work pieces each suspended on a hanger, through and past one or more processing stations. Large work pieces may be suspended from two hangers. The work pieces so moved can be similar or dissimilar. In some situations it is desirable to transfer a hanger with a work piece from one conveyor to another. This has been done by a synchronous transfer unit, such as another conveyor or a transfer wheel, which operates synchronously with one conveyor to serially remove hangers and transfer the hangers to another conveyor, which operates synchronously with the transfer unit. The previously described system usually uses two (2) conveyors, one being a continuous conveyor and the other known as a power and free conveyor. The power and free conveyor provides the benefit that hangers can be linked in and out of the conveyor motion (i.e. they can be stopped for loading). Sometimes the transfer is between two continuous conveyors.

However, it is desirable in some situations to identify and selectively remove a hanger with a work piece from one conveyor for transfer to the other conveyor or vice versa. But the synchronous type of unit only transfers all hangers on a conveyor as they serially or sequentially approach the transfer unit rather than selected hangers.

Therefore it is an object of this invention to identify and select hangers associated with one conveyor and transfer the selected hanger to a second conveyor.

Usually the work pieces are on a hanger or hangers which include a hook. The hanger is suspended from the conveyor which also has hooks that couple with and engage the hanger hook. More specifically, the conveyor includes a plurality of outwardly opening hooks that are moved along the conveyor and the work piece hanger includes an inwardly open hook that engages and hangs from an outwardly open conveyor hook. In order to transfer a hanger from one conveyor to another, the orientation of the inwardly opening hanger hook must be such that it maintains its cooperative and coupling orientation relative to the outwardly open conveyor hooks. Usually this means that the hanger is retrieved from one conveyor, rotated 180° about its vertical axis and then delivered to the other conveyor. Using a synchronous transfer wheel this hanger rotation occurs as the hanger is moved about the periphery or circumference of the transfer wheel.

It is another object of this invention to provide for identifying the hanger to be retrieved and retrieving the selected hanger from one conveyor, rotating the hanger 180° about a vertical axis, and delivering the hanger and work piece to another conveyor or even to a specifically selected conveyor hook if need be.

The system of this invention can be used in the power and free/continuous or continuous/continuous situations.

These and other objects of this invention will become apparent from the following description and appended claims.

SUMMARY OF THE INVENTION

There is provided by this invention a transfer unit, that is of a linear type, for transferring an identified and selected hanger with a suspended work piece from one conveyor to another. The hanger is identified and selected for removal by a bar coding system associated with the hangers and the transfer unit. The transfer unit includes a rotatable indexing table from which a linear arm is suspended. The arm is at an acute angle relative to the conveyor's direction of movement and the size of the angle is related to the speed of conveyor. On the arm there is a pick up shuttle that moves between the ends of the arm and is arranged to approach a conveyor at right angles in order to pick up a hanger and approach the other conveyor at right angles for depositing the hanger on the other conveyor. The shuttle is retracted from a conveyor at a speed related to the conveyor speed, so as to eliminate the possibility of the retrieved work piece striking an immediately forward or rearward work piece. More specifically, the shuttle is retracted along the arm until the picked hanger is centered below the indexing table. At that point the indexing table pivots or rotates 180° so that the hanger hook's orientation is reversed or rotated 180° about its vertical axis. Then the shuttle is moved to a drop off position where the hanger is deposited on the other conveyor. It is to be noted that the shuttle also approaches the other conveyor at right angles.

Moreover, after the initial or set up phase there are always two hangers on the transfer unit, one at the center and one at the end.

This system includes numerous other features such as hook lifting mechanisms on the shuttle, a two-ended shuttle, a reversible direction for the indexing table, hook stabilizers and other features. These features will be described hereinafter.

DESCRIPTION OF THE PREFERRED EMBODIMENT

Figure 1:
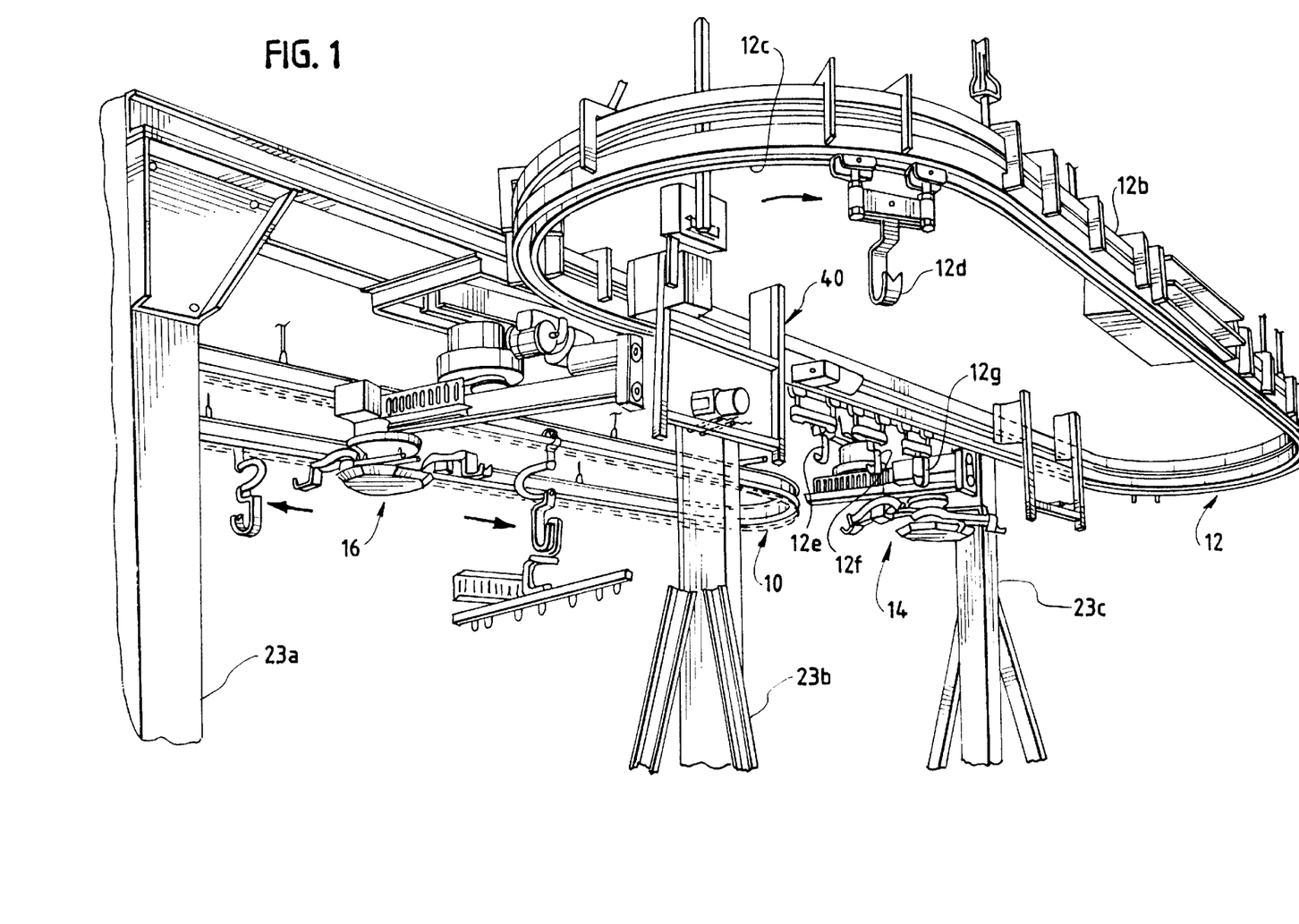
FIG. 1 is a perspective view showing two conveyor systems and two transfer units therebetween.

Referring first to FIG. 1, a standard or continuous conveyor 10 is shown. A power and free conveyor 12 generally is also shown at one side of the standard conveyor 10 and spaced therefrom. Positioned between the two conveyors are two linear transfer units generally referred to with numerals 14 and 16. The transfer unit 14 picks up a hanger and work piece from the power and free conveyor 12 and transfers it to continuous conveyor 10. The second transfer unit 16 can retrieve an item off of the continuous conveyor 12 and place it on the power and free conveyor 10. The system can be seen in plan view in FIG. 2.

Figure 3A:
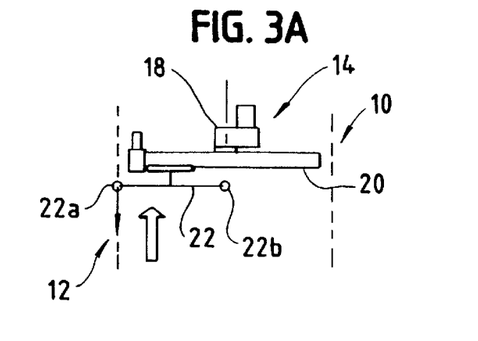
FIGS. 3a–3h diagrammatically depict various stages of operation of a transfer unit.

In FIG. 3A the elements are presented diagrammatically. The left-hand dashed-line represents a side of the power and free conveyor 12. The right hand-line represents the side of a standard or continuous conveyor such as 10. The transfer unit such as 14 includes: (a) a rotatable indexing table 18; (b) an arm 20 which extends between the conveyors 10 and 12 and which is suspended from the table 18; and (c) a shuttle 22 which moves on the arm between the ends thereof and the conveyors 10 and 12. As shown in FIG. 3A the shuttle 22 is moved to the left hand side of arm 20 and the shuttle end 22*a* picks a load off the power and free conveyor and supports it from the shuttle. The other end 22*b* of the shuttle is positioned below the center of the indexing table.

Figure 3B:
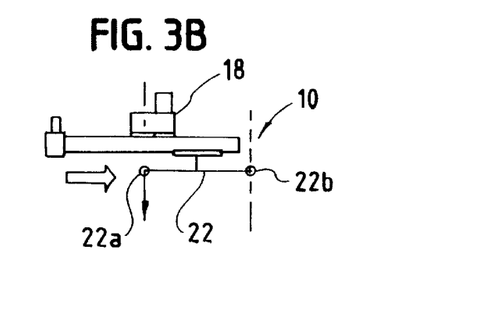

The shuttle is then shifted as in FIG. 3B in the right hand direction whereby the end 22*a* with the load is positioned below the indexing table 18 and the other end 22*b* of the shuttle is positioned at the conveyor 10.

Figure 3C:
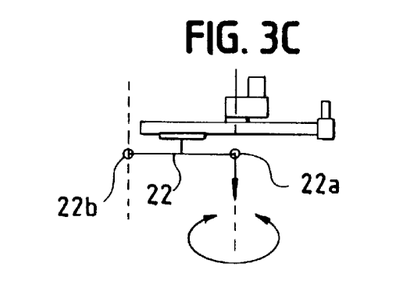
Figure 3D:
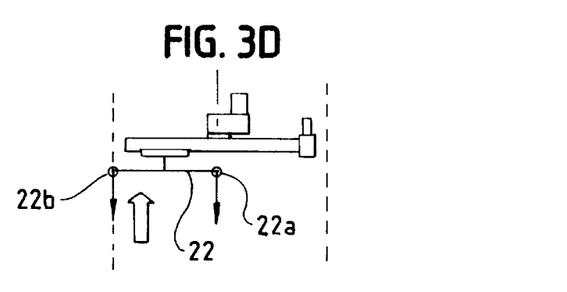
Figure 3E:
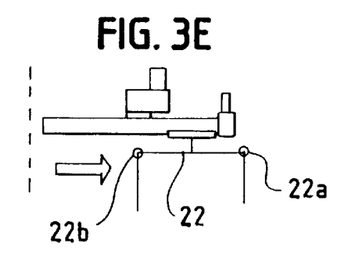
Figure 3F:
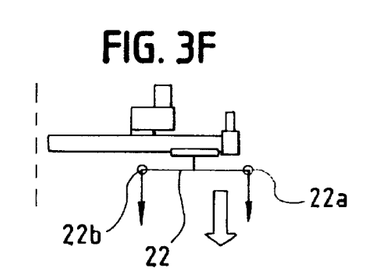

At that point (FIG. 3C) the indexing table rotates 180° and the shuttle 22 is moved adjacent the power and free conveyor 12 and the loaded end 22*a* is rotated 180°. The shuttle 22 thus includes the loaded end 22*a* at the center position and the end 22*b* positioned to pick up a second load from the power and free conveyor (FIG. 3D). The fully loaded shuttle 22 is then shifted (FIG. 3E and 3F) to the right hand side or to the conveyor 10 where the load at the end 22*a* is deposited on the conveyor 10. It is seen that the load 22*b* is centered below the indexing table.

Figure 3G:
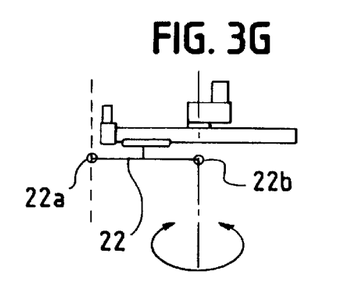
Figure 3H:
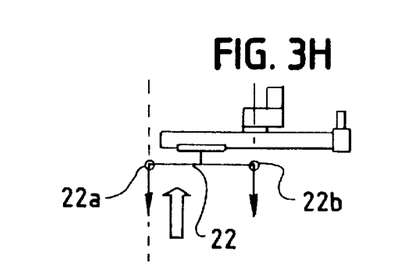
Figure 4:
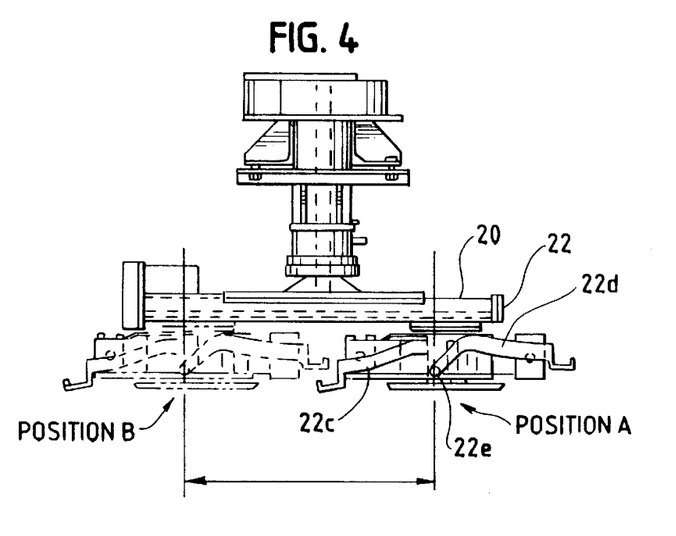
FIG. 4 is a side elevational view of the transfer unit showing the shuttle in two different positions.

The indexing table 18 then rotates (FIG. 3G) the arm 180° places the shuttle 22 on the power and free conveyor side of the arm. At that point the loaded end 22*b* is positioned below the center of the indexing table for rotation. The empty end 22*a* is positioned at the power and free conveyor 12. Then (FIG. 3H) the end 22*a* can pick up another load indicated by the arrow and the end 22*b* remains loaded. After this initial set up the unit cycles through the steps beginning with FIG. 3B. The FIG. 3A arrangement is only used in the initial phases. It is using this system that the transfer unit can remove an item from one conveyor and transfer it to a second conveyor. The previous discussion described the system in a conceptual manner.

Figure 2:
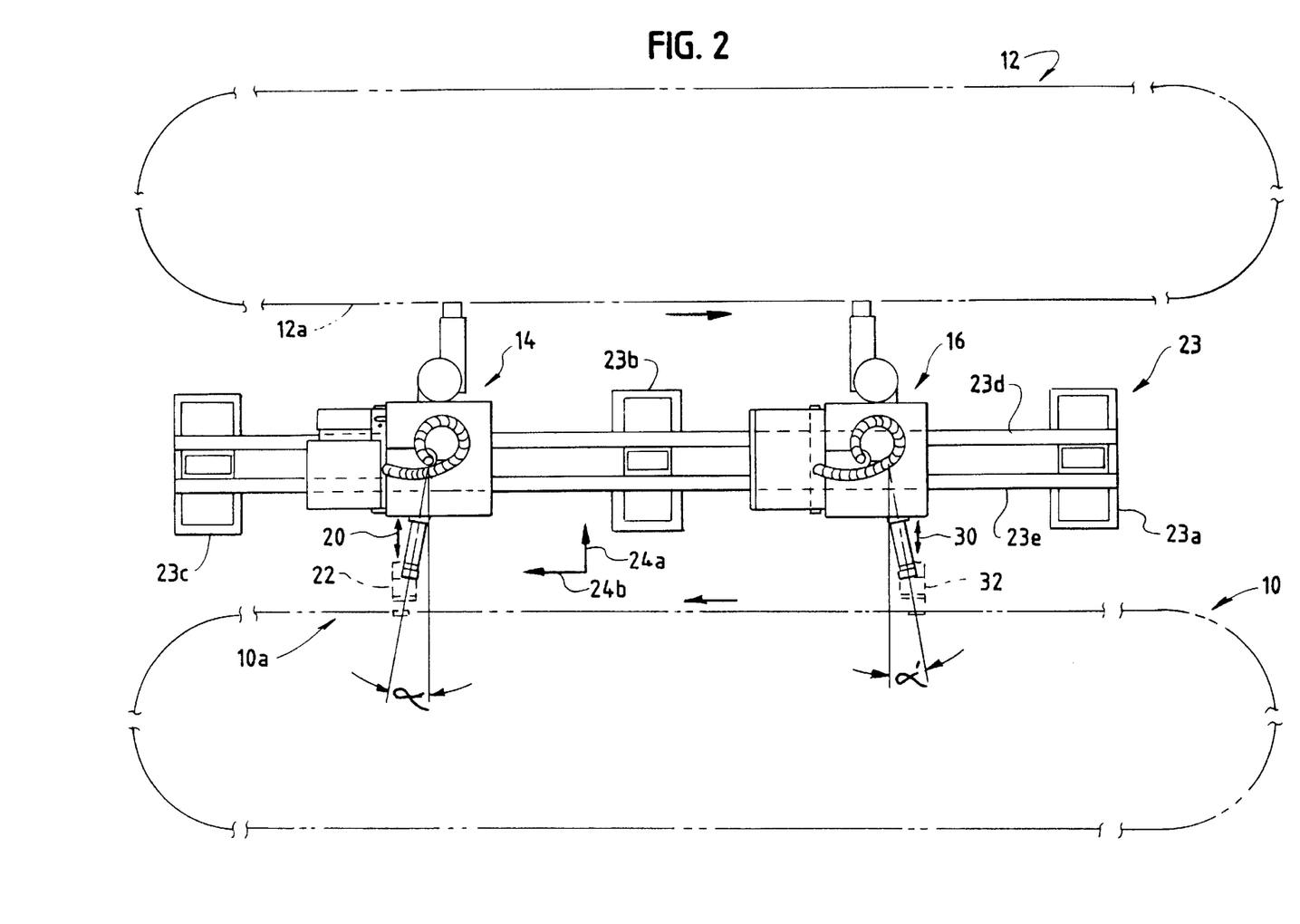
FIG. 2 is a diagrammatic plan view of two oval conveyor systems and two linear transfer units therebetween.

Referring now to FIG. 2 it is seen that the conveyor 10 generally is elliptically shaped and operates in a counterclockwise direction. The inside leg 10*a* moves in a right to left direction as shown by the arrow. Spaced therefrom is the power and free conveyor 12 which is also elliptically shaped and operates in a counterclockwise direction. However, the inside leg 12*a* generally operates in a left to right direction. A prototype has been disclosed. In commercial operation the conveyors are not elliptically shaped and extend through various manufacturing zones with many curves but form a circuit. Moreover the conveyors are not limited to operating in a counterclockwise direction and whatever the direction of movement the angle of the linear transfer unit can be set accordingly. In the space between the conveyors 10 and 12 are the transfer units 14 and 16. They cooperate with legs 10*a* and 12*a* to transfer hangers and work pieces between the respective conveyors. The transfer units are supported by a frame structure 23 generally which includes posts 23*a*, 23*b*, and 23*c* and cross members 23*d* and 23*e* which are supported by the posts and span the distance between the posts and support the transfer units 14 and 16. While the support frames for the transfer units are shown close together it is to be understood that the frames may be spaced apart a great distance so as to adjust to and accommodate different industrial conditions. The conveyor 10 is a single track conveyor. However, the conveyor 12 is known as a power and free conveyor and includes two track sections, the upper section 12*b* and the lower section 12*c* as seen in FIG. 1. The upper section runs continuously and the bottom section supports a plurality of hook assemblies such as 12*d* which include a coupling and uncoupling mechanism that permits the conveyor hook assemblies to be coupled and uncoupled from the continuously running conveyor upper section 12*b* for parking and unparking or intermittent running.

Figure 5:
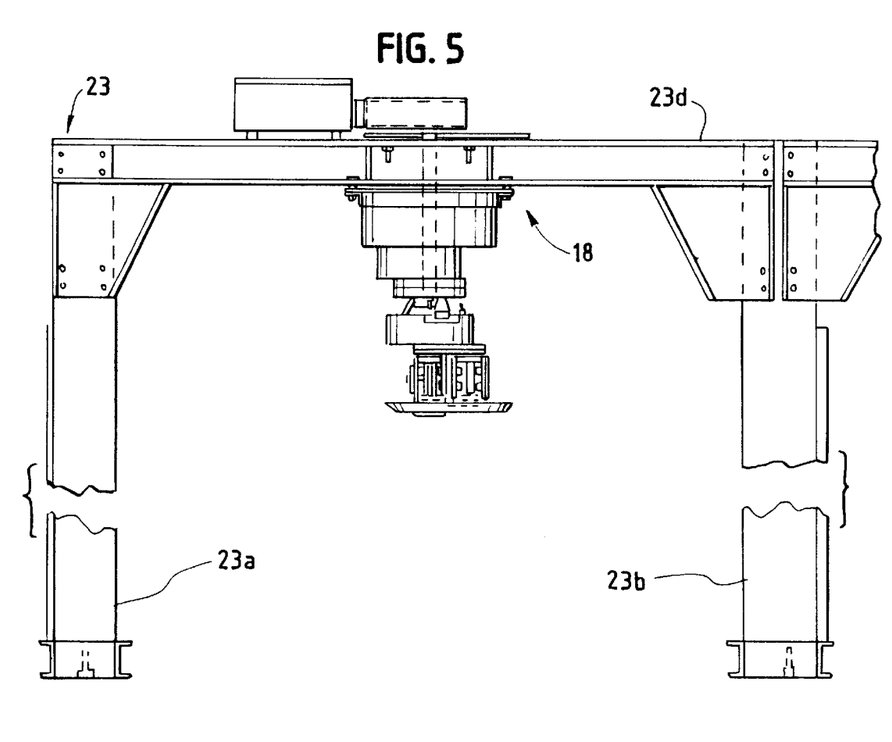
FIG. 5 is a front elevational view showing the transfer unit supported from a frame work.

Referring now to FIG. 5, the transfer unit 16 is shown supported by the frame 23 including the posts 23*a* and 23*b* and cross member such as 23*d*. In this view the indexing table 18 is seen.

Referring again to FIG. 2 it is seen that the transfer unit arms 20 and 30 are positioned at a small angle alpha ($\alpha$) or alpha prime ($\alpha'$) to the direction of the movement of the conveyor leg 10*a*. Similarly the arms are oriented at a small angle relative to the power and free conveyor leg 12*a*. However, the shuttles 22 and 32 are oriented at right angles or perpendicularly to the legs 10*a* or 12*a*. The angle at which the arm is oriented to the direction of movement of the conveyor is proportional to the speed of the conveyor. The shuttle 32 is designed to pick a hanger off of continuous conveyor leg 10*a* without slowing the conveyor by striking a trailing hanger or work piece or striking a leading or forward work piece. Shuttle 32 will drop off the hanger on the power and free conveyor leg 12*a*. Thus the shuttle 32 in a sense retrieves the hanger, then withdraws on the arm and indexes and then the arm is rotated 180° so that the shuttle is positioned adjacent the track 12*a* to drop off the loaded hanger.

The transfer unit first rotates 180° in one direction and then rotates 180° in the reverse direction so as to prevent the power cables from becoming entangled. For example transfer unit 16 may first rotate in a clockwise direction and then reverse rotation to the counterclockwise direction.

The angular positioning of arm 20 on unit 14 or arm 30 on unit 16 relative to conveyor 10*a* and the straight in movement of the shuttles 22 or 32 assures movement of the work piece which can be viewed as including two vectors 24*a* and 24*b*, one parallel to the conveyor side and one perpendicular to the conveyor side. The vectors are suggested by arrows 24*a* and 24*b*. Thus the angle of the arm and speed of the shuttle can minimize interference. It will be noted that the arm 20 is positioned in the third quadrant while the arm 30 is positioned in the second quadrant. This generally relates to the use of the arm and related shuttle. With respect to conveyor 10 the unit 14 is employed to place a product on the conveyor whereas unit 16 is used to pick a product off the conveyor 10.

Referring now to FIGS. 4, 8, 9 and 10 the shuttle 22 is seen. The shuttle is supported by the arm 20 and driven by a servo drive (not shown) between positions at the end of the arm. However, many other types of mechanisms for the shuttle drive can be used such as a variable frequency drive, stepper motor, pneumatic or hydraulic pistons or the like. The shuttle itself is intended to move between the arm ends and to pick and drop off hangers at either extreme. At each end the shuttle has hanger lift arms 22*c* and 22*d*. Each of the arms such as 22d is pivotally secured to the shuttle at a pivot point such as 22e. The arms are shaped so as to define a cam-like surface which cooperates with a moveable cam roller assembly or sleeve such as 22f. The cam roller part of a sleeve that is moveable toward one end of the shuttle and retractable therefrom. As the sleeve moves, the cam roller assembly 22f raises and lowers an arm such as 22d as it raises and lowers the hook end 22g. On the sleeve are stabilizer plates 22j and 22k which engage the hook so as to minimize swinging movement thereof. The arm 22d is in a lower non-engaging position as suggested in FIG. 9. When a cam roller assembly such as 22f is moved toward the shuttle end, the hook 22g moves upwardly into a hook engaging position as in FIG. 9. It will be appreciated that a similar portion for the arm 22d is provided on the unseen side of the shuttle. Thus the hook extends fully across the end of the shuttle and is operated by arms on both sides of the shuttle.

Figure 9:
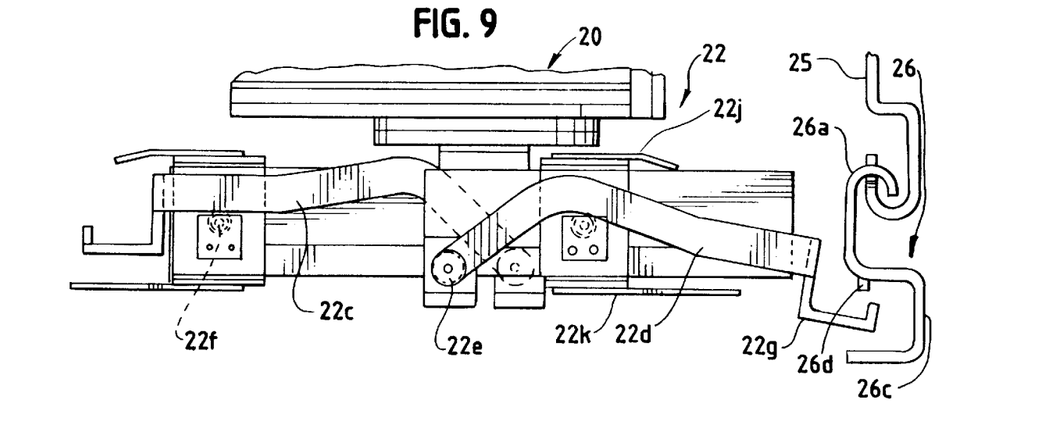
FIG. 9 is an elevational view showing the hook system for picking a hanger from the conveyor with the pick up hook disposed beneath the work piece carrying hanger.
Figure 10:
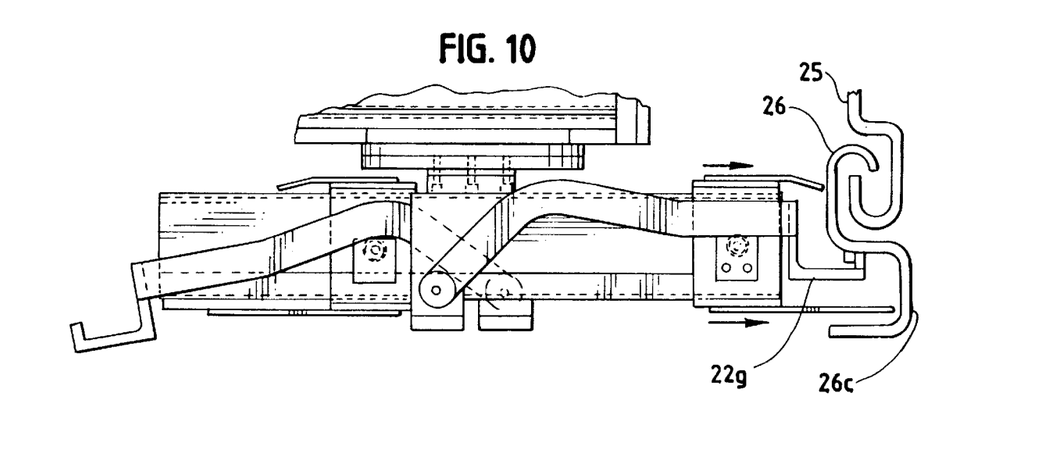
FIG. 10 is a view similar to FIG. 9 but showing the hook in an upward position so as to grasp the hanger for the work piece.

Referring now to FIG. 9, cooperation between the lifting arms and the hanger and conveyor hooks is seen. An arm such as 22d with the cam roller 22f, pivot 22e and hook 22g are shown in FIGS. 9 and 10. In both figures the conveyor hook such as 25 is shown. In general the hook opening faces outwardly from the conveyor. The hanger 26 includes (a) a hook section 26a for cooperating with a conveyor hook 25, (b) a lower recessed or open portion 26c for receiving lifting the hook 22g and (c) a stop or flange 26d which the lifting hook 22g engages and which assures a positive connection between the hanger 26 and hook 22g. As seen in FIG. 9 the arm and lifting hook approaches a hanger 26 with the hook in the lower position and to be positioned within the recess defined by the lower section 26b and in a position to engage the stop or flange 26d. In that view it is seen that the cam roller assembly 22f is in an inward position. The cam roller assembly 22f is urged outwardly thereby raising the lifting hook 22g.

With reference to FIG. 10 it is seen that the arm and lifting hook are raised, by operating the cam follower, and thus engage the hanger. By raising the hanger 26, the hanger 26 is disengaged from the conveyor hook 25 and is positioned for retraction and removal from the conveyor. In order to raise the hook, the cam follower roller moves beyond the sloped shape of the lift arm to the horizontal or flat shape, thus limiting the upward movement of the hook and locking it in its upper position free of pressure from the sleeve actuating pneumatic cylinders (not shown). The roller assembly (sleeve) continues to move forward until the stabilizer plates 22j and 22k have engaged the hanger and its stop 26c is the up-ended finger of the lifting hook 22g. This secures the hanger at three points.

Figure 6:
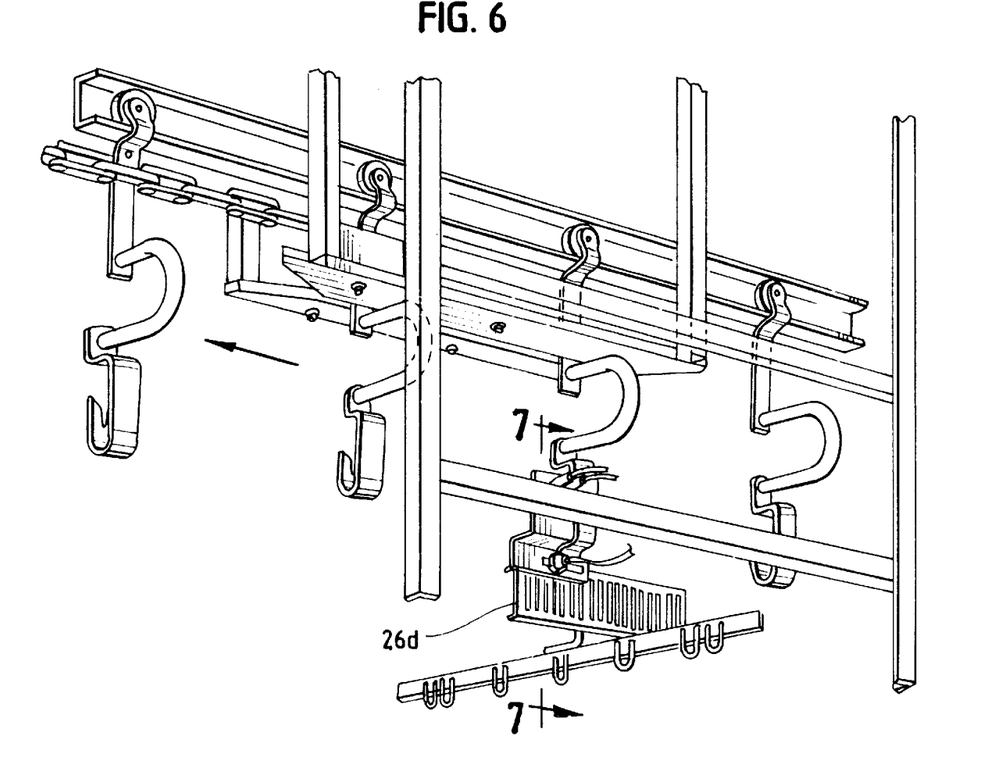
FIG. 6 is a perspective-like view depicting a portion of a conveyor with its hook system and a hanger and work piece carrier with bar coded slotting therein.
Figure 7:
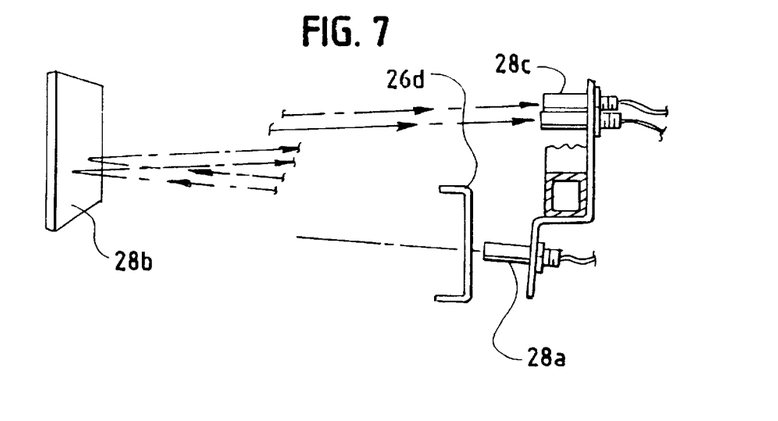
FIG. 7 is a diagrammatic view of a light based sensor system for reading bar coding taken along line 7—7 of FIG. 6.

The selection of a hanger for removal and positioning of the hanger is in large part accomplished by a bar coding system integral with the item carrying hanger. However, other recognition systems can be used. The item carrying hanger below the hook portion includes a slotted metal frame 26d (FIG. 6) which is slotted in such a fashion as to provide a bar coding system which can be read by a light system. The bar coded slotted member 26d moves through a light path 28 which is generated by a light emitting member 28a which directs light along a path 28 to reflector 28b and then the light returns from the reflector 28b to the sensors such as 28c. The bar coded information from the sensor then is used to operate the transfer unit and so selectively identify hangers for removal. Thus the member 26d passes through the light path, the bar code is read and information as to the hanger's work piece and location is provided to the transfer unit for operation of the unit and selection of the hanger.

It will be appreciated if the power and free conveyor 12 permits the power and free hooks such as 12e, 12f and 12g (see FIG. 1) to be disengaged and enter parked positions for pick up, when released, by the transfer unit such as 16. The clamp-like assembly 40 is provided to position the hooks 12e, 12f or 12g for pick up by the shuttle.

Figure 8:
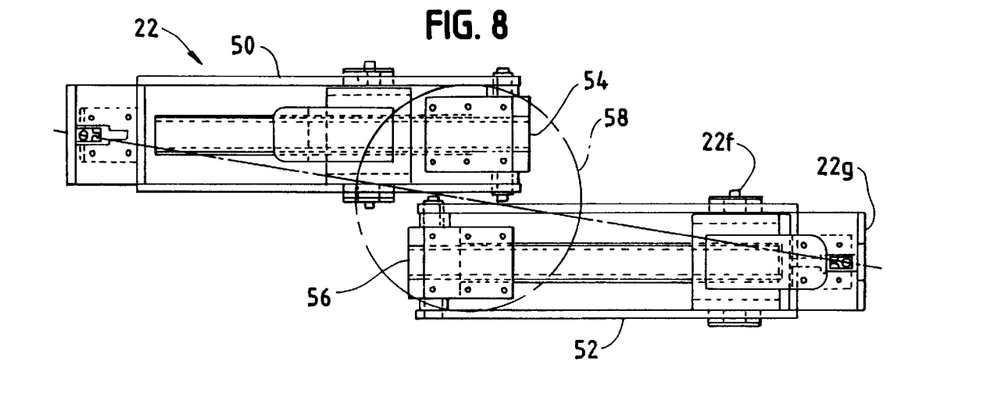
FIG. 8 is a plan view showing the shuttle portion of the transfer unit which shows two side by side lift arm units interconnected by a connector plate.

Referring to FIG. 8, the shuttle such as 22 includes two side by side lift arm assemblies 50 and 52. Each of the lift arm assemblies 50 and 52 include a connector plate 54 and 56. A circular inner connector plate 58 is provided for bolting the two lift arm assemblies together at plates 54 and 56 and for connection with the rail and indexing table.

The side by side orientation of the lift arm assemblies can be reversed depending upon usage of the shuttle as a pick up or drop off mechanism.

In operation the conveyor 10 includes a plurality of conveyor mounted hooks on which hangers carrying various kinds of work pieces are suspended. The conveyor moves past various processing stations. However, it may be desirable to remove selected hangers or work pieces for further processing and thus move them to another conveyor. The hangers are provided with a bar code such as 26d which identifies the hanger. The bar code is read to determine the nature of the work piece and the position of the hanger. From there the hanger moves to a point where the transfer unit such as 16 is activated. At that position the arm 30 is positioned toward the conveyor where the pick up will occur and the shuttle 32 moves to the conveyor. When positioned the shuttles' lifting hook such as 22g is positioned below the hanger. The lifting hook is then raised so as to cause the hanger to disengage from the conveyor hook. The shuttle is then moved from the conveyor on the arm with the hanger supported therefrom.

The shuttle is then moved to the opposite end of the arm and the hanger rotated with the hanger at the center of the transfer unit. This rotates the hanger 180° so it may be deposited on the other conveyor. The transfer unit is operated as shown in FIG. 3 and deposits the hook on the power and free conveyor's hanger and the transfer is thus complete.

It will be appreciated that the reverse operation occurs whereby treated parts on conveyor 12 are picked off the conveyor and deposited on conveyor 10.

It will be appreciated that numerous changes and modifications can be made to the embodiments disclosed herein.

What is claimed is:

1. A unit for transferring at least one product supporting hanger from one conveyor to another conveyor which unit is positioned between the conveyors and includes:

a rotatable support having a substantially vertical axis about which it is rotatable, said support positioned between the conveyors;

an elongated rail assembly suspended from and mounted to the rotatable support for rotation therewith;

a shuttle assembly mounted to and suspended from the rail assembly for movement with the rail assembly and for movement on the rail assembly from one end of the rail assembly to the other end, said shuttle assembly being elongated and having hook members at either end for grasping the hanger, said rail assembly constructed and arranged so that when said shuttle is positioned at an end of the rail assembly, one end of the shuttle assembly is positioned in line with the vertical axis of the rotatable support and the other end of the carrier assembly is positioned to cooperate with a conveyor.

2. A transfer unit as in claim 1 wherein the rail assembly is linear.

3. A transfer unit as in claim 1 wherein the shuttle assembly mounted to the said assembly is for movement generally normal to a conveyor.

4. A transfer unit as in claim 1 wherein said rail assembly is positioned at an angle to a conveyor.

5. A transfer unit as in claim 4 wherein the rail assembly angle to a conveyor is related to and proportional to the speed of the conveyor.

6. A transfer unit as in claim 1 wherein each hook member includes an elongated and shaped arm pivotally secured to the shuttle assembly and moveable between a lower non-hanger engaging position to an upper hanger engaging position.

7. A transfer unit as in claim 6 wherein there is provided a sleeve-like cam follower assembly for engaging and moving the hook member between the engaging and non-engaging positions.

8. A transfer unit as in claim 1 and in combination therewith a pair of overhead conveyors one of which is constructed to move a plurality of items to processing stations and the other of which is constructed to receive and to move a plurality of items selected from the first conveyor.

9. A transfer unit as in claim 1 wherein said hanger unit includes bar coding types of machine readable indicia for transmission to the unit.

10. A transfer unit as in claim 6 wherein the cam follower also includes a pair of stabilizer plates for engaging a hanger to be sported.

11. A transfer unit as in claim 1 and in combination therewith one conveyor being a power and free conveyor and the other being a continuous conveyor.

12. A method for selectively identifying at least one hanger unit on a first conveyor and transferring said to a second conveyor including:

providing first and second conveyors, a rotatable transfer unit therebetween, a hanger unit operable with the first and second conveyor and an identifying system associated with each hanger and the transfer unit for identifying a hanger unit to be selectively removed from a first conveyor and transferred to a second conveyor;

identifying a hanger unit to be removed from one conveyor and transferred from one conveyor to the other;

engaging a hanger unit from the first conveyor;

withdrawing the hanger unit from the first conveyor to a position aligned with the center of the rotation of the transfer unit for rotation therewith, rotating the hanger unit 180° substantially about its own vertical axis;

positioning the hanger unit on the second conveyor; and disengaging the hanger unit for movement on the second conveyor.

13. A method for selectively identifying at least one hanger on a first conveyor and transferring said hanger to a second conveyor including:

providing first and second conveyors, a rotatable transfer unit therebetween, a hanger operable with said first and said second conveyor and an identifying system associated with each hanger and transfer unit for identifying a hanger to be selectively removed from a first conveyor and transferred to a second conveyor;

identifying a hanger to be removed from one conveyor and transferred from one conveyor to the other; engaging and removing a hanger from the first conveyor;

moving the hanger to a position substantially below the center of the transfer unit;

rotating the hanger unit substantially about its own vertical axis;

positioning the hanger on the second conveyor; and disengaging the hanger for movement with the second conveyor.

* * * * *